F. G. KNOFLICEK.
TIRE HEATER.
APPLICATION FILED NOV. 28, 1917. RENEWED JUNE 9, 1919.

1,328,330.

Patented Jan. 20, 1920.
2 SHEETS—SHEET 1.

Inventor
Frank G. Knoflicek.

By Lacey & Lacey, Attorneys

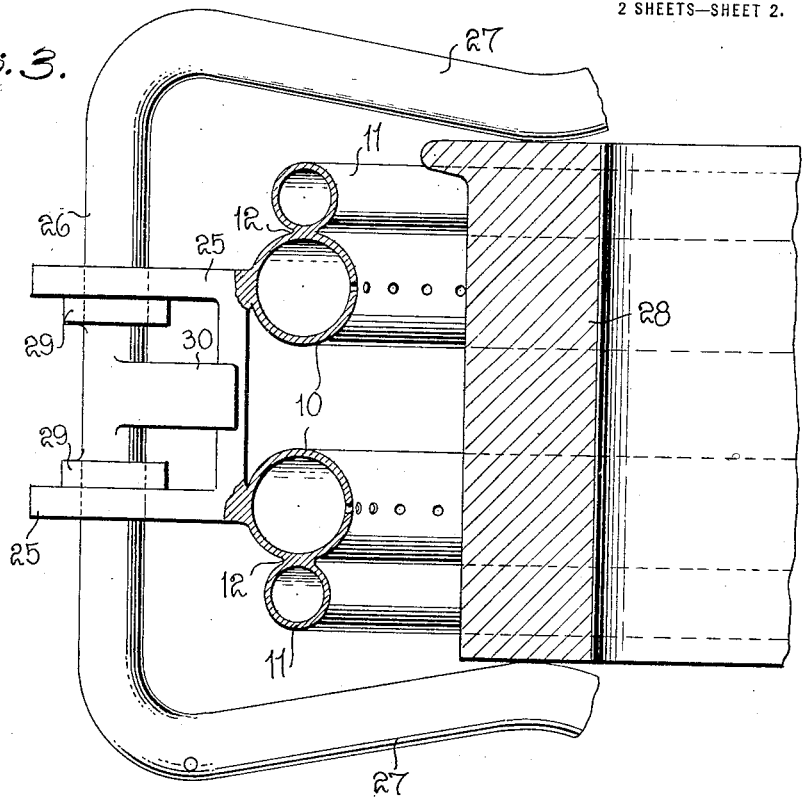
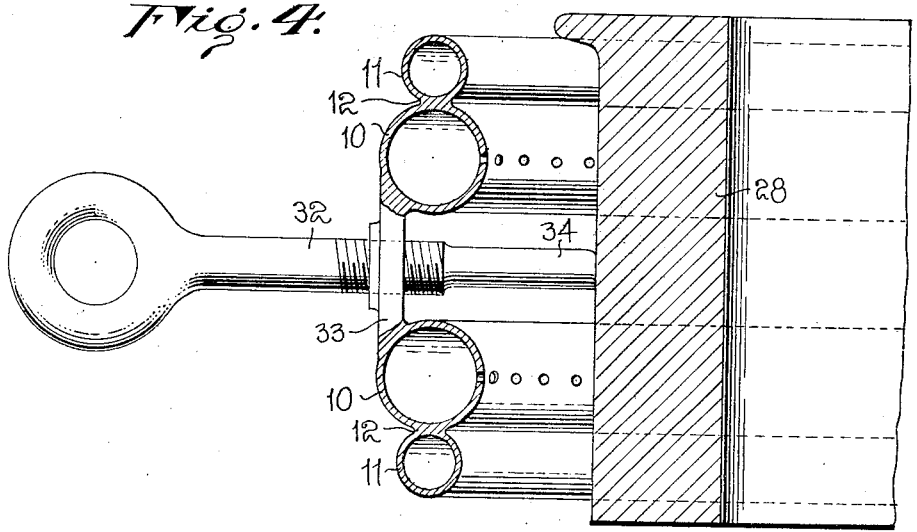

UNITED STATES PATENT OFFICE.

FRANK G. KNOFLICEK, OF SILVIS, ILLINOIS.

TIRE-HEATER.

1,328,330.     Specification of Letters Patent.     Patented Jan. 20, 1920.

Application filed November 28, 1917, Serial No. 204,478. Renewed June 9, 1919. Serial No. 303,002.

*To all whom it may concern:*

Be it known that I, FRANK G. KNOFLICEK, a citizen of the United States, residing at Silvis, in the county of Rock Island and State of Illinois, have invented certain new and useful Improvements in Tire-Heaters, of which the following is a specification.

This invention relates to heating devices, more particularly applicable to the heating of the metal tires of wheels, such as locomotive drive wheels and the like, which are required to be heated uniformly throughout their area to cause a sufficient expansion to enable them to be applied to the body of the wheel or "shrunk" thereon when the tire is cooled.

The primary object of my invention is to provide a device of this character in which the fuel supply chamber or pipe is formed integrally with or welded to one side of the burner so that the incoming supply of fuel passing through the supply pipe adjacent the burner will tend to keep the burner cool and prevent it from cracking and the heat from the burner will preheat the fuel as it passes through the supply pipe and aid in gasifying it.

Another object of the invention is to provide a device of this character having appliances whereby the object to be heated is supported in proper position relative to the heat applying devices during the heating operation.

Figure 1:
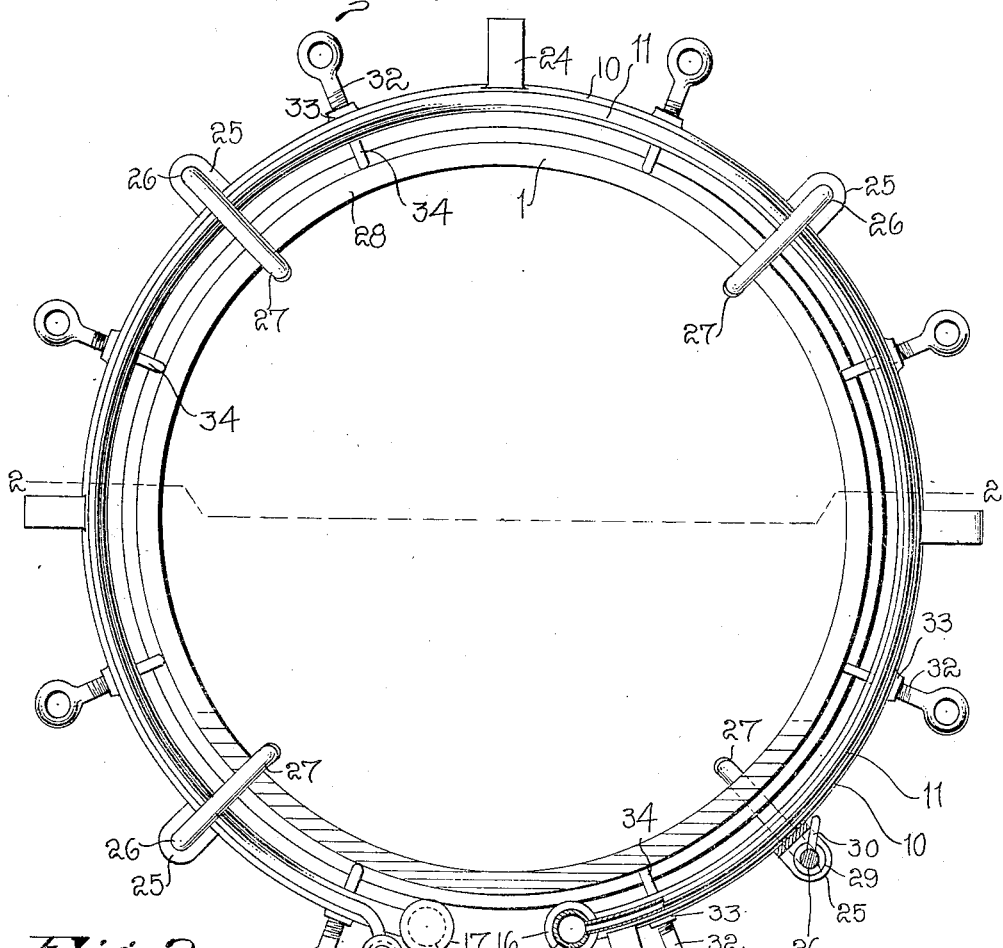
Figure 2:
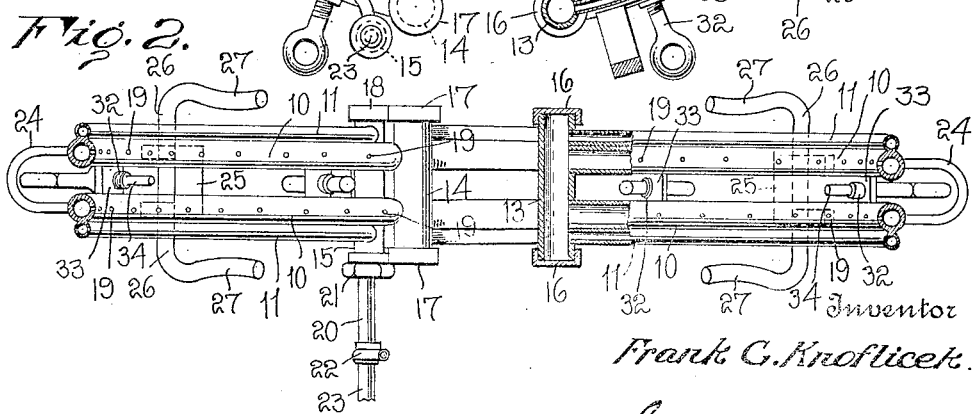

The invention consists in the novel and improved constructions, arrangements, and devices to be hereinafter described and claimed for carrying out the above stated objects, and such other incidental objects as will appear from the following description of a preferred embodiment of the invention illustrated in the accompanying drawings, wherein:

Figure 1 is a side elevation of a preferred embodiment of the device as applied to a locomotive tire, Fig. 2 is a transverse section on the line 2—2 of Fig. 1 without the tire, Fig. 3 is an enlarged sectional detail illustrating the arrangement of the burner and fuel supply pipe and one of the locomotive tire supporting clip devices, together with a section of a locomotive tire, Fig. 4 is a view similar to Fig. 3 illustrating the manner of supporting the tire relative to the burner and fuel supply pipe.

Like reference characters designate like parts throughout the several views.

The improved device includes a tubular burner, represented as a whole at 10, and a fuel supply pipe or tubular vaporizing member, represented as a whole at 11. The burner 10 and vaporizing member are either formed integrally or are rigidly united throughout their entire length, preferably by electrically welding two sections of tubing, preferably steel. The vaporizing member 10 is preferably approximately one-half the diameter of the tubular burner as illustrated in Figs. 3 and 4. The welding is indicated at 12, thus rendering the two parts 10—11 integral from end to end, so that the heat from the burner tends to heat the fuel in the vaporizing member and the fuel therein tends to keep the burner cool and prevent it from cracking. The burners 10 and adjacent vaporizers 11 are preferably arranged in pairs in spaced relation with the burners confronting each other and the vaporizing members externally of the burners, as illustrated more particularly in Figs. 3 and 4. At one end the associated burner and vaporizing members 10—11 are united to a transverse tubular member or header 13, while at their opposite ends the burners 10 are united to a transverse tubular member or header 14. The vaporizing members 11 adjacent the tubular member 14 are bent outwardly and united to a transverse tubular member or header 15 as illustrated in Figs. 1 and 2. The tubular members 13 and 14 are provided at their ends respectively with detachable caps 16 and 17, while the tubular member 15 is provided with a detachable cap 18 at one end, to enable the tubular members to be cleansed when required. The burners 10 are provided with gas escape orifices 19 suitably spaced, to permit the vaporized fuel to escape. The members 10 with their orifices 19 thus constitute elongated burners, the gas being ignited at the orifices. The feed pipe for a suitable hydro-carbon, preferably kerosene oil, is represented at 20 and is coupled to the member 15 by a "union" 21. Coupled at 22 to the outer end of the pipe 20 is a conductor tube, preferably a section of hose represented at 23, the pipe 20 being of sufficient length to locate the hose 23 the requisite distance from the body of the apparatus to prevent injury thereto from the heat. By this arrangement the liquid fuel in its unvaporized condition is fed to the vaporizing members 11 through the tubular member 15 at one end and traverses the entire length of the vaporizing members before it passes into the tubular transverse member 13 and thence into the burners 10. The heat radiating from the burners 10 vaporizes the liquid fuel in the members 11 before it reaches the transverse member 13, and the fuel thus passes as a combustible gas into the members 10 at one end and thence traverses the entire length of the members 10 and escapes at intervals through the orifices 19 where it is ignited.

By this means an efficient hydro-carbon burner is produced which may be extended to any required length either curved or straight as may be required.

The burners 10 are united, preferably by electric welding, at suitable intervals by outwardly arching yoke devices 24 which serve the two-fold purpose of holding the burners rigidly together and as means for applying tongs or other implements to the device to handle the apparatus when it is hot. Attached, preferably by electrical welding, to the burners 10 at suitable intervals are supporting brackets 25 having transversely alined bearings to rotatably receive a shaft 26, the latter having its terminals 27 directed laterally for bearing when in one position against the edges of the object to be heated, for instance the tire of a locomotive represented at 28. The shaft 26 is provided with suitable collars 29 between the side members of the brackets 25 to prevent longitudinal movement of the shaft relative to the bracket. Extending from each of the shafts 26 between the side members of the brackets 25 is a stop 30 to limit the movement of the shaft in one direction, the free end of the stop engaging against the base of the bracket when the terminals of the portions 27 are in engagement with the side faces of the tire as illustrated in Fig. 3. The holding devices 26—27 may thus be disposed in position to support the tire, and will be prevented from movement beyond a certain predetermined point by the stop member 30, while at the same time the holding devices may be turned in the opposite direction to release the tire when not required, or when the device is to be removed from or applied to the tire. Any required number of the holding devices may be employed, but when the apparatus is arranged as a tire heater four of the holding devices will generally be required as shown in Fig. 1.

A plurality of adjusting devices may be employed. These devices comprise threaded members 32 operating through a threaded member 33 coupled to the burners 10, preferably by electrical welding. At their inner ends the members 32 are reduced as shown at 34, and adapted to bear against the outer face of the object to be heated, for instance a tire 28 as illustrated in Fig. 4.

When arranged as a tire heater the transverse tubular members 13—14 will be spaced a short distance as illustrated in Figs. 1 and 2, so that the burner jets or orifices 19 will be disposed opposite almost the entire circumference of the tire. Preferably the orifices 19 of one of the members 10 will be disposed opposite the spaces between the orifices of the other member 10 as illustrated in Fig. 2, so that the jets of flame will be distributed more uniformly around the surface of the object to be heated, thus equalizing the action of the heat imparting medium and correspondingly heating the object at all points equally.

The hydro-carbon fuel will preferably be supplied under pressure of about 110 pounds to the square inch, and will be mixed with the requisite quantity of air.

While I have shown and described my invention as applied to the heating of a locomotive tire it will be understood that it may have utility for the heating of various other devices. I do not intend to limit my invention to the details of construction shown and described, except as certain of the appended claims are specifically so limited, as it will be obvious to those skilled in the art that various modifications may be made without departing from the spirit of my invention.

Having thus described the invention, what is claimed as new is:

1. An apparatus of the class described comprising coacting tubular burner members in spaced relation, connected at the ends, and provided with lateral orifices, combined tubular supply and vaporizing members respectively engaged longitudinally with the burner members and communicating therewith at one end, clip devices uniting said burner members, and means for supplying hydro-carbon to the vaporizing members.

2. An apparatus of the class described comprising coacting tubular burner members in spaced relation connected at the ends and provided with lateral orifices, combined tubular supply and vaporizing members respectively engaged longitudinally with the burner members and communicating therewith at one end, spacer members coupled to said burner members, and means for supplying hydro-carbon to the vaporizing members.

3. An apparatus of the class described comprising coacting tubular burner members in spaced relation connected at the ends and provided with lateral orifices, combined tubular supply and vaporizing members respectively engaged longitudinally with the burner members and communicating therewith at one end, holding members mounted for rotation on said burner member and including supporting arms adapted to engage the object to be heated, and means for supplying hydro-carbon to the vaporizing members.

4. An apparatus of the class described comprising spaced burners, vaporizers associated therewith, a bracket connecting the burners, and a rim engaging member journaled in the bracket.

5. An apparatus of the class described comprising spaced burners, a vaporizer connected with each burner, a bracket connecting the burners, a rim engaging member journaled in the bracket, and a stop carried by the rim engaging member and adapted to engage the bracket for limiting the rotary movement of said rim engaging member.

6. An apparatus of the class described comprising spaced burners, a plate connecting the burners, and an adjusting device extending through the plate for engagement with a tire.

7. An apparatus of the class described comprising spaced burners, brackets connecting the burners, plates secured to the burners at points between the brackets, and rim adjusting devices threaded in the plates.

8. An apparatus of the class described comprising spaced burners, vaporizers connected with the burners, tubular members forming a connection between the burners and vaporizers at the ends thereof, means for admitting fuel into the vaporizers, brackets connecting the members and provided with laterally extending arms, rim engaging devices journaled in the brackets and provided with collars bearing against the arms, lugs carried by the rim engaging devices for engagement with the brackets for limiting the turning movement of the rim engaging devices, plates connecting the burners at points between the brackets, and rim adjusting devices extending through said plates.

9. An apparatus of the class described comprising a burner, a vaporizing chamber in communication with and alongside said burner, and means to supply fuel to said vaporizing chamber, said vaporizing chamber being integrally united to said burner.

10. An apparatus of the class described comprising a burner, a vaporizing chamber in communication with and alongside said burner, and means to supply fuel to said vaporizing chamber, said vaporizing chamber being substantially of the same length as said burner and integrally united thereto.

11. An apparatus of the class described comprising a burner, and a vaporizing chamber alongside of said burner of substantially the same length and integrally united thereto, one end of said vaporizing chamber being in communication with one end of said burner, the other end of said burner being closed and the other end of said vaporizing chamber being connected to fuel supply means.

12. An apparatus of the class described comprising a pair of burners, headers connected across the respective ends of said burners, vaporizing chambers alongside each of said burners of substantially the same length as said burners and integrally united thereto, said vaporizing chambers being connected at one end to one of said headers and at the other end to fuel supply means.

13. An apparatus of the class described comprising a pair of burners, vaporizing chambers alongside each of said burners and integrally united thereto, one end of each of said vaporizing chambers being in communication with one end of said respective burners, the other end of each of said burners being closed and the other end of each of said vaporizing chambers being connected to fuel supply means.

14. An apparatus of the class described comprising a pair of burners held in spaced relation, headers connected across the respective ends of said burners, vaporizing chambers alongside each of said burners and integrally united thereto, said vaporizing chambers being connected at one end of said headers and at the other end to fuel supply means.

FRANK G. KNOFLICEK.